United States Patent
Anvari

(10) Patent No.: US 7,729,419 B1
(45) Date of Patent: Jun. 1, 2010

(54) RECONDITIONING EQUALIZER FILTER USING CONVOLUTION

(75) Inventor: Kiomars Anvari, 1567 Serafix Rd., Alamo, CA (US) 94507

(73) Assignee: Kiomars Anvari, Alamo, CA (US)

( * ) Notice: Subject to any disclaimer, the term of this patent is extended or adjusted under 35 U.S.C. 154(b) by 776 days.

(21) Appl. No.: 11/603,725

(22) Filed: Nov. 24, 2006

(51) Int. Cl.
*H03H 7/30* (2006.01)
*H04L 27/08* (2006.01)
*H03F 3/66* (2006.01)
*H03F 1/26* (2006.01)
*H03F 1/00* (2006.01)
*H04B 1/04* (2006.01)

(52) U.S. Cl. ............... 375/232; 375/229; 375/345; 375/230; 330/151; 330/149; 455/114.2; 455/114.3; 455/127.2

(58) Field of Classification Search ......... 375/232–234, 375/296–297; 330/149–152, 52; 455/67.11
See application file for complete search history.

(56) References Cited

U.S. PATENT DOCUMENTS

| | | | | |
|---|---|---|---|---|
| 5,485,120 A | * | 1/1996 | Anvari | 330/151 |
| 5,594,385 A | * | 1/1997 | Anvari | 330/149 |
| 5,610,554 A | * | 3/1997 | Anvari | 330/52 |
| 5,986,499 A | * | 11/1999 | Myer | 330/52 |
| 6,285,412 B1 | * | 9/2001 | Twitchell | 348/608 |
| 6,298,097 B1 | * | 10/2001 | Shalom | 375/297 |
| 7,142,831 B2 | * | 11/2006 | Anvari | 455/114.2 |
| 7,146,138 B2 | * | 12/2006 | Anvari | 455/114.3 |
| 7,394,849 B2 | * | 7/2008 | Ibragimov et al. | 375/233 |
| 7,460,613 B2 | * | 12/2008 | Sahlman | 375/296 |
| 7,463,697 B2 | * | 12/2008 | Maltsev et al. | 375/297 |
| 7,649,927 B1 | * | 1/2010 | Anvari | 375/150 |
| 2004/0005001 A1 | * | 1/2004 | Jones et al. | 375/232 |
| 2004/0203540 A1 | * | 10/2004 | Anvari et al. | 455/114.3 |
| 2007/0147490 A1 | * | 6/2007 | Okamoto et al. | 375/232 |
| 2007/0254592 A1 | * | 11/2007 | McCallister et al. | 455/67.11 |

* cited by examiner

*Primary Examiner*—Mohammad H Ghayour
*Assistant Examiner*—Eboni Giles

(57) ABSTRACT

A technique for a reconditioning equalizer filter using convolution is described. The input to a transmitter chain is modified by a reconditioning equalizer filter using convolution prior to being applied to the transmitter. The reconditioning equalizer filter modifies and smoothen the amplitude of the main baseband signal. The modified and smoothen main baseband signal has its peaks reduced which results to lower Crest Factor. The input to the reconditioning equalizer filter using convolution could be a baseband, an intermediate frequency (IF) or radio frequency (RF) signal. When the signal is an IF or RF signal it needs to be down converted to baseband before applied to reconditioning equalizer filter using convolution.

4 Claims, 3 Drawing Sheets

RECONDITIONING EQUALIZER FILTER USING CONVOLUTION

BACKGROUND OF INVENTION

The present invention relates to a reconditioning equalizer filter using convolution to boost the performance of any communication transmitter with non-constant envelope signal. The reconditioning equalizer filter input could be baseband, intermediate frequency (IF), or RF signal, and its output is the peak reduced and smoothen baseband signal that can be up converted to IF or RF. In any wireless communication system one of the critical sub-systems is the transmitter. This sub-system has a major contribution in cost, power consumption, and size of the system. The main reason is the requirement of communication transmitter sub-system for linear components. The higher the linearity, the higher the power consumption, cost and size. In order to minimize the cost, size and power consumption there is a need for techniques that overcome this problem. This invention conquers these challenges by using a simple and accurate reconditioning equalizer filter using convolution module used at the input to this sub-system.

SUMMARY OF INVENTION

According to the invention, a low-cost reconditioning equalizer filter using convolution to reduce the crest factor of baseband signal, for use with any communication transmitter sub-system with non-constant envelope signal, uses a plurality of simple and accurate algorithm in conjunction with intelligent signal processing to improve signal handling of any wireless, optical, or wireline communication transmitter. By intelligent, it is meant that the algorithm has features of maintaining the signal emission and quality requirements while applying the reconditioning equalizer filter using convolution. The reconditioning equalizer filter using convolution utilizes the transmitter sub-system input which could be a baseband, an IF or RF signal as its input and conditions and smoothens the signal before applying to the transmitter sub-system. The conditioning and smoothening helps to boost the power handling of the transmitter sub-system or acts more linearly. The inputs to the reconditioning equalizer filter using convolution should be within a limit that can be handled by the reconditioning equalizer filter using convolution.

In a particular embodiment, the reconditioning equalizer filter's algorithm comprises a signal processing module. The signal processor performs the signal conditioning and smoothening.

The invention will be better understood by reference to the following detailed description in conjunction with the accompanying drawings.

DESCRIPTION OF THE SPECIFIC EMBODIMENTS

In a first preferred embodiment of the invention, the reconditioning equalizer filter using convolution utilizes sub-harmonic sampling to convert RF or IF signals to digital baseband signal. In a second preferred embodiment the main baseband signal is amplitude conditioned and smoothened using a reconditioning equalizer filter using convolution. In a third embodiment the reconditioning equalizer filter using convolution adjusts the injected in band and out of band signal into main baseband signal by configuring a convolution filter in a feedforward loop. In a fourth embodiment the reconditioning equalizer filter using convolution adjusts the injected out of band signal into the main baseband signal using a second feedforward loop. In fifth embodiment one of the convolving signals is a pre-configured baseband signal and the other signal to convolution filter is the subtraction of the delay and gain adjusted main baseband signal and the peak reduced main baseband signal. In a sixth embodiment the out put of the reconditioning equalizer filter using convolution is used as the new input to the transmit sub-system.

Figure 1:
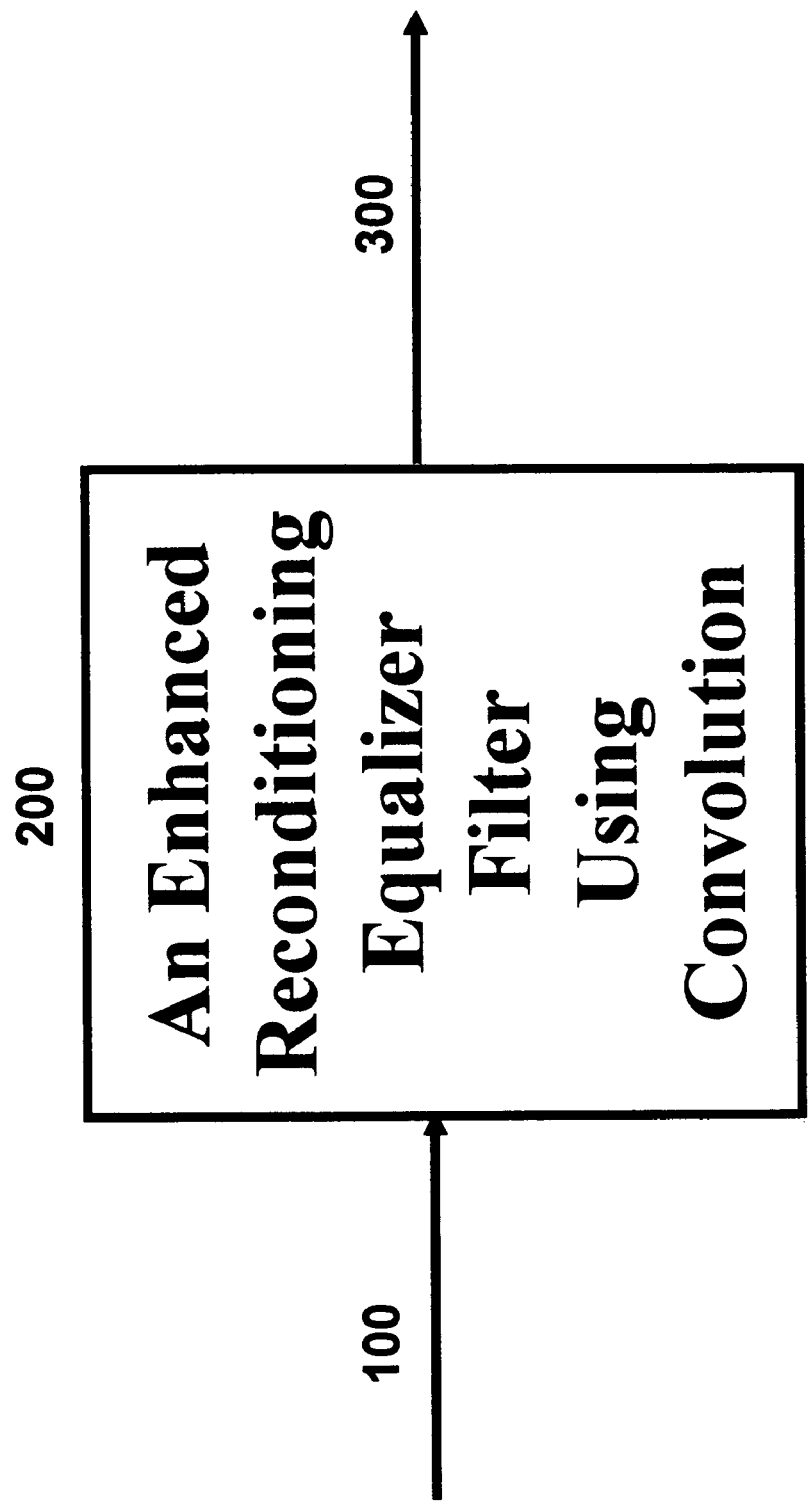
FIG. 1 is an overall function diagram of the reconditioning equalizer filter using convolution

Referring to FIG. 1, a reconditioning equalizer filter using convolution function diagram is illustrated. The reconditioning equalizer filter using convolution 200 receives its main baseband input 100 and produce conditioned and smoothened output 300. The reconditioning equalizer filter using convolution performs the following functions:

1. Condition and smoothen the amplitude of the input signal 100 before applying it to transmitter sub-system.
2. Adjust the gain in the signal paths to keep the total gain from input to output of the reconditioning equalizer filter using convolution unity.

Figure 2:
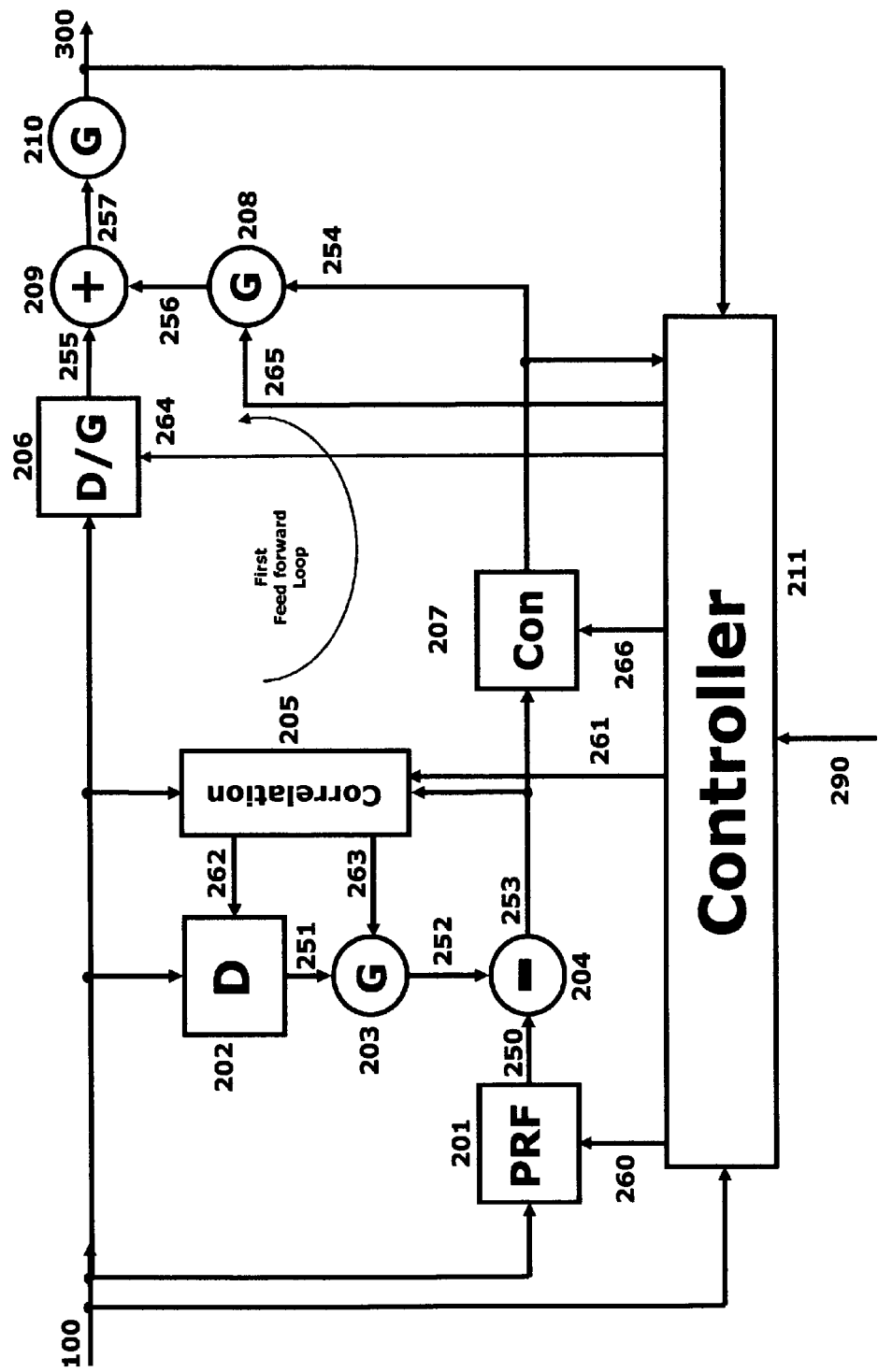
FIG. 2 is the detail function diagram of the reconditioning equalizer filter using configurable convolution low pass filter in a first feedforward loop

FIG. 2 illustrates the detail function diagram of the reconditioning equalizer filter using convolution. The received main baseband signal 100 is applied to Peak Reduction Filter (PRF) 201 to produce peak reduced main baseband signal 250. The PRF 201 receives control signal 260 from controller 211 to adjust the peak reduction. The main baseband signal 100 is delayed by delay function 202 to produced delayed main baseband signal 251. The delayed main baseband signal 251 is gain adjusted by gain function 203 to produce delay and gain adjusted main baseband signal 252. The delay and gain adjusted main baseband signal 252 is subtracted from peak reduced baseband signal 250 in subtraction function 204 to produce baseband signal 253. The amount of delay 262 and gain adjustment 263 are calculated by the correlation function 205 that uses main baseband signal 100 and signal 253 as its input. The correlation function 205 also receives a control signal 261 from controller function 211 to calculate the delay value 262 and gain adjustment value 263. The baseband signal 253 is convolved with signal 266 in convolution function 207 to adjust in band and out of band baseband signal and produce baseband signal 254. The convolving signal 266 is provided by controller function 211. The baseband signal 254 is gain adjusted by gain function 208 to produced gain adjusted in-band baseband signal 256. The amount of gain adjustment 265 is provided by controller function 211. The main baseband signal 100 is delay and gain adjusted by delay/gain function 206 to produce delay/gain adjusted main baseband signal 255. The delay/gain adjusted main baseband signal 255 and the gain adjusted in band/out of band baseband signal 256 are summed in summation function 209 to produce modified main baseband signal 257. The modified main baseband signal 257 is gain adjusted by gain function 210 to produce reconditioned and smoothen baseband signal 300. The main baseband signal 100 and the modified baseband signal 300 are applied to controller 211 to provide the gain and delay parameters needed for the gain functions and the correlation function.

Figure 3:
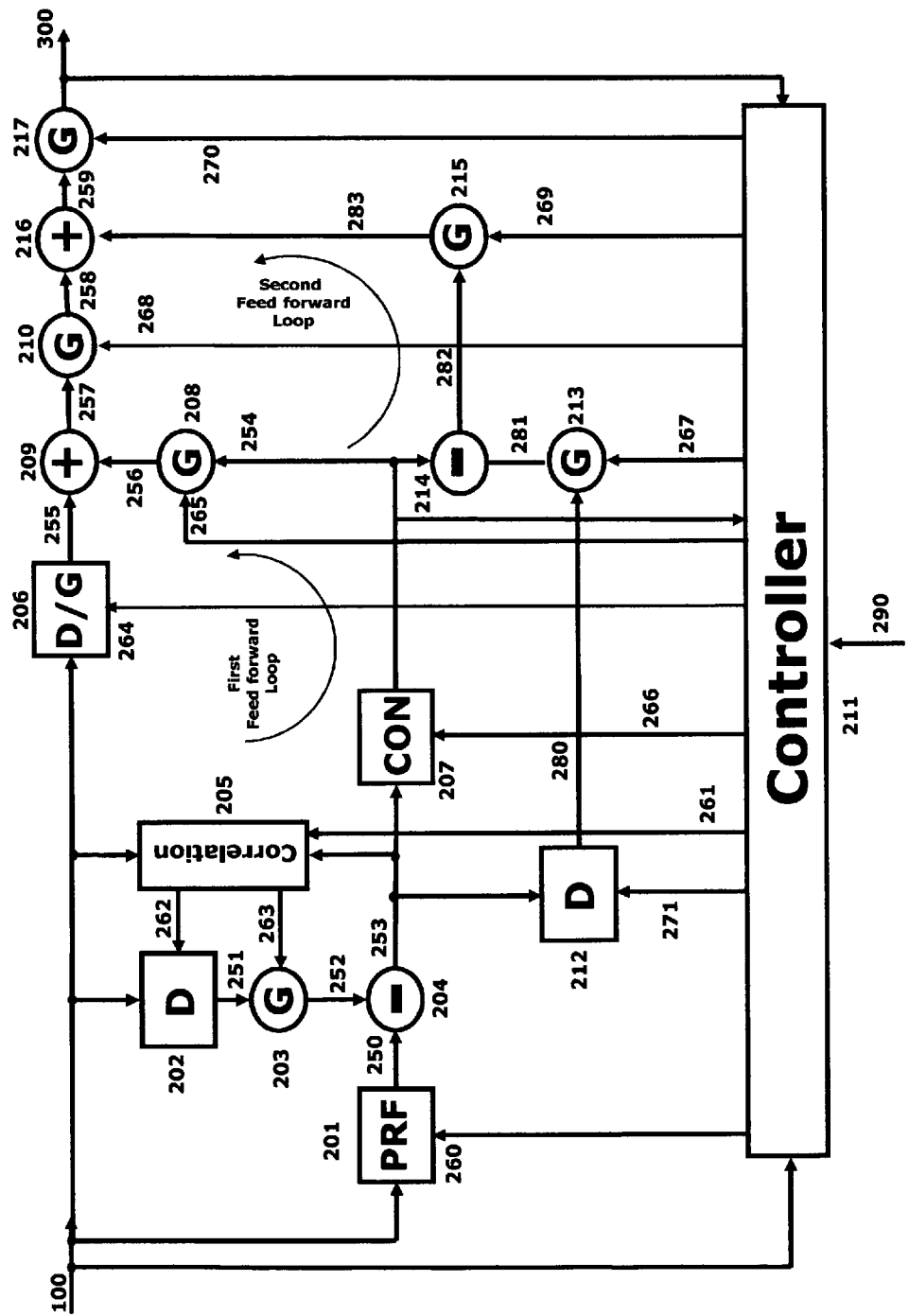
FIG. 3 is the detail function diagram of the reconditioning equalizer filter using convolution with adjustable out of band signal level in a second feedforward loop

FIG. 3 illustrates the detail function diagram of the reconditioning equalizer filter using convolution module. The received main baseband signal 100 is applied to Peak Reduction Filter (PRF) 201 to produce signal 250. The PRF 201 receives control signal 260 from controller 211 to adjust the peak reduction. The main baseband signal 100 is delayed by delay function 202 to produced delayed main baseband signal 251. The delayed main baseband signal 251 is gain adjusted by gain function 203 to produce delay and gain adjusted main baseband signal 252. The delay and gain adjusted main baseband signal 252 is subtracted from peak reduced baseband signal 250 in subtraction function 204 to produce baseband signal 253. The amount of delay 262 and gain adjustment 263 are calculated by the correlation function 205 that uses main baseband signal 100 and signal 253 as its inputs. The correlation function 205 also receives a control signal 261 from controller function 211 to calculate the delay value 262 and gain adjustment value 263. The baseband signal 253 is convolved with signal 266 in convolution function 207 to adjust remove any out of band baseband signal and produce in band baseband signal 254. The convolving signal 266 is provided by controller function 211. The baseband signal 254 is gain adjusted by gain function 208 to produced gain adjusted baseband signal 256. The amount of gain adjustment 265 is provided by controller function 211. The main baseband signal 100 is delay and gain adjusted by delay/gain function 206 to produce delay/gain adjusted main baseband signal 255. The delay/gain adjusted main baseband signal 255 and the gain adjusted in band baseband signal 256 are summed in summation function 209 to produce modified main baseband signal 257. The modified main baseband signal 257 is gain adjusted by gain function 210 to produce conditioned and smoothen baseband signal 258. The baseband signal 253 is delayed by delay function 212 to produce baseband signal 280. The baseband signal 280 is gain adjusted by gain function 213 to produce baseband signal 281. The amount of delay adjustment 271 for delay function 212 and gain adjustment 267 for gain function 213 are supplied by controller function 211. The baseband signal 281 is subtracted from baseband signal 254 in subtraction function 214 to produce the out of band baseband signal 282. The out of band baseband signal 282 is gain adjusted by gain function 215 to produce gain adjusted out of band baseband signal 283. The out of band baseband signal 283 is added to main baseband signal 258 in summation function 216 to produce reconditioned and smoothen main baseband signal 259. The baseband signal 259 is gain adjusted by gain function 217 to produce reconditioned and smoothened baseband signal 300. The amount of gain value 270 for gain function 217 is supplied by controller 211. The main baseband signal 100 and the modified baseband signal 300 are applied to controller 211 to provide the gain and delay parameters needed for the delay and gain functions and the correlation function.

What is claimed is:

1. A reconditioning equalizer filter using convolution to enhance the performance of any communication transmitter, in any wireless cellular, Personal Communication System (PCS), wireless Local Area Network (LAN), Wireless Wide Area Network (WAN), WiMax, Video and Audio Wireless Broadcasting, line of sight microwave, military, optical, and satellite communication systems and any other non-wireless applications, the reconditioning equalizer filter using convolution comprising:
   a first feedforward loop to adjust an injected in-band baseband signal into a main baseband signal;
   a second feedforward loop to adjust an amount of out of band baseband signal injected into the main baseband signal;
   a peak reduction filter to produce a peak reduced main baseband signal;
   a gain function that adjusts the gain of the main baseband signal;
   a controller that uses the main baseband signal, the output of reconditioning equalizer filter using convolution, provides predefined configurable baseband signal for the convolution function, and external information to provide control signal to various delay and gain functions as well as the peak reduction filter, the convolution filter and the correlation function;
   a first feedforward loop comprising:
       a first feedforward loop that injects a controlled in-band and out of band baseband signal into the main baseband signal;
       a first gain element that adjusts the gain of the main baseband signal to produce a gain adjusted main baseband signal;
       a first delay element that adjusts the delay of the main baseband signal to produce a delay adjusted main baseband signal;
       a subtractor that subtracts the delay and gain adjusted main baseband signal and the peak reduced main baseband signal;
       a correlation function that correlates the main baseband signal and the result of the subtraction of the peak reduced main baseband signal and delay and gain adjusted main baseband signal to calculate the amount of delay and gain adjustment for the main baseband signal;
       a digital baseband convolution filter that uses a configurable predefined baseband signal, and filters the result of the subtraction of the delay and gain adjusted main baseband signal and the peak reduced main baseband signal as its input to produce an output that adjusts the in band and out of band baseband signal of the main baseband signal;
       a second gain element that gain adjusts the result of the convolution of a configurable predefined baseband signal, the result of the subtraction of the delay and gain adjusted main baseband signal and the peak reduced main baseband signal;
       a third gain element that gain adjusts the main baseband signal in the reconditioning equalizer filter using convolution;
       a second delay element that delays the main baseband signal in the reconditioning equalizer filter using convolution;
       a delay/gain adjustment element that delay and gain adjusts the main baseband signal in the reconditioning equalizer filter using convolution;
       a first summer that adds the delay and gain adjusted main baseband signal, the gain adjusted result of convolution of the subtraction of the peak reduced main baseband signal and the delay and gain adjusted main baseband signal and a pre-defined configurable baseband signal;
   a second feedforward loop comprising:
       a second feedforward loop that only injects adjustable out of band baseband signal into main baseband signal;

a third gain element that adjusts the gain of the subtraction of the delay and gain adjusted main baseband signal and the peak reduced main baseband signal in the second feedforward loop;

a second delay element that adjusts the delay of the subtraction of the delay and gain adjusted main baseband signal and peak reduced main baseband signal in the second feedforward loop;

a second subtractor that subtracts the results of the delay and gain adjusted subtraction of the delay and gain adjusted main baseband signal and the peak reduced main baseband signal and the convolution filtered subtraction of the delay and gain adjusted main baseband signal and peak reduced main baseband signal;

a fourth gain element that adjusts the gain of the subtraction of the results of the delay and gain adjusted subtraction of the delay and gain adjusted main baseband signal and the peak reduced main baseband signal and the convolution filtered subtraction of the delay and gain adjusted main baseband signal and the peak reduced main baseband signal;

a second summer that adds the reconditioned and smoothened baseband signal resulted from the first feedforward loop with the gain adjusted subtraction of the results of the delay and gain adjusted subtraction of the delay and gain adjusted main baseband signal and peak reduced main baseband signal and the convolution filtered subtraction of the delay and gain adjusted main baseband signal and peak reduced main baseband signal to further condition and smoothen the main baseband signal.

2. The reconditioning equalizer filter using convolution according to claim 1, wherein a controller uses the input and the output of the reconditioning equalizer filter to control the delay and gain adjustment blocks used in reconditioning equalizer filter using convolution.

3. The reconditioning equalizer filter using convolution according to claim 1, when it is used in any wireless and wireline communication transmitter, in wireless cellular, wireless PCS, wireless LAN, Wireless WAN, Wireless Broadband, microwave, wireless satellite, WiMax, wireless audio and video broadcasting, any wireline broadband cable and Digital Subscriber Line (DSL) transmitter, optical transmitters, and any wireless communication systems used for military applications.

4. The reconditioning equalizer filter using convolution according to claim 1, wherein the Digital Signal Processing (DSP) function can be implemented in programmable logic, Field Programmable Gate Array (FPGA), Gate Array, Application Specific Integrated Circuit (ASIC), and/or DSP processor.

* * * * *